Oct. 28, 1930.    A. J. MUMMERT    1,779,487
PISTON AND PISTON RING
Filed Jan. 19, 1929

INVENTOR
Arden John Mummert
By Henry Kinealy
ATTORNEY

Patented Oct. 28, 1930

1,779,487

UNITED STATES PATENT OFFICE

ARDEN JOHN MUMMERT, OF UNIVERSITY CITY, MISSOURI, ASSIGNOR TO McQUAY-NORRIS MANUFACTURING COMPANY, OF ST. LOUIS, MISSOURI, A CORPORATION OF DELAWARE

PISTON AND PISTON RING

Application filed January 19, 1929. Serial No. 333,537.

My invention relates to pistons and piston rings and more particularly to pistons and piston rings such as are ordinarily used in internal combustion or other types of compression engines.

The trend of design in engines of this type is now toward higher piston speeds and higher working pressures with a resultant greater heat development and higher piston temperatures and in the operation of engines of such design difficulties have been encountered in satisfactorily dissipating the developed heat from the piston. For instance, doubling the speed of the piston consequently doubles the number of explosions per minute and increases the amount of heat developed while the heat dissipating factors remain constant.

It is desirable that the heat be dissipated from the piston as much as possible through the upper part thereof, that is, through the part containing the ring grooves and their contained piston rings, which part is known in the art as the ring belt. Therefore, the heat is dissipated before the heat reaches the skirt of the piston because the skirt should have only a small clearance from the cylinder wall and if too much heat reaches the skirt it may expand and contact with the cylinder wall. Also, the head of the piston and the lands between the annular grooves therein adapted to receive the piston rings must have a comparatively great clearance from the cylinder wall so that there is no possibility of these parts being expanded sufficiently by it to contact with the cylinder wall and, in turn, the cylinder contacting faces of the piston rings are positioned radially beyond the head and lands so as to form the entire cylinder contacting surface of the ring belt of the piston. Therefore, I have found that the piston rings, since they are in contact with the cylinder wall, must be depended upon to dissipate from sixty to ninety per cent of the heat developed in the piston by transferring the heat to the cylinder wall and its adjacent water jacket.

Figure 4:
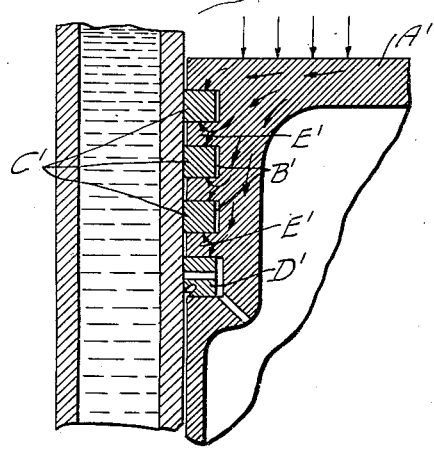

A piston and the rings carried thereby as heretofore used is shown in Fig. 4 in the drawings wherein the piston A' has a plurality of annular ring receiving grooves B' in each of which is mounted a ring C' of conventional design. In the lowermost groove I have shown an oil ring D' constructed in accordance with the teachings of Letters Patent No. 1,567,452 heretofore issued to me on December 29, 1925. Most piston rings now manufactured are adapted, by rendering them axially compressible, or by other expedients, to contact simultaneously with both side walls of the grooves in which they are mounted, as shown in Fig. 4. In the use of piston rings of conventional design only part of the heat transferred to the piston ring from the piston head through the lands E' between adjacent grooves B' and through the contacting surfaces of the side walls of the grooves and the side face of the ring, as shown by the arrows in Fig. 4, can be transferred to the cylinder wall through the cylinder contacting face of the ring because this cylinder contacting face is of less area than the combined areas of the side faces of the ring in contact with the side walls of the groove. Also, because of this the flow of heat from the ring is less than the flow into the ring and, thereby, there is a resultant resistance to flow through the piston head.

Heretofore the practice has been to increase the heat dissipating factors by increasing the number of piston rings used on the head of a piston. However, such a practice increases the cost of manufacture of a piston and, of course, increases the cost of the rings used thereon and, in addition, increases the combined weight of the piston and the rings, and this should be avoided.

The object of my invention is to provide a piston and a piston ring so constructed and arranged as to increase the amount of heat transferred from the head of the piston to the cylinder wall and, in turn, thereby to increase the heat dissipation factors.

Figure 1:
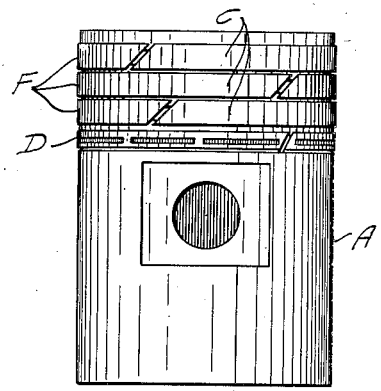
Figure 2:
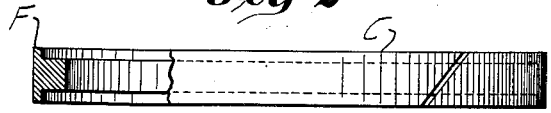
Figure 3:
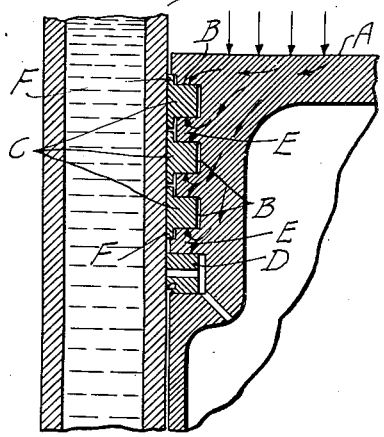

One form of piston and piston ring embodying my invention is shown in Figs. 1 to 3, inclusive, of the accompanying drawings, wherein similar letters are used to designate similar parts; Fig. 1 shows the devices in perspective; Fig. 2 is a view partly in section of one of my new and improved piston rings; and Fig. 3 shows somewhat diagrammatically a fragment of the head of the piston and of the cylinder wall in section.

Referring to the figures in the embodiment therein the head of the piston A has a plurality of annular grooves B, the three upper grooves are adapted to receive a piston ring C embodying my invention and the lowermost groove is adapted to receive a piston ring D embodying the invention described in my previously issued Letters Patent mentioned above. The lands E between adjacent grooves and adjacent the top and bottom grooves B adapted to receive the piston rings C are, preferably, formed integral with the head of the piston and set back from the face of the piston, as shown particularly in Fig. 3, for the purposes more fully outlined below. Each of the piston rings C, preferably, comprises a resilient split band substantially rectangular in cross section, and as shown, is provided with a flange extending from each side of the ring axially of the piston. The flange F has a cylinder contacting face arranged to engage the cylinder wall. As shown in the drawings, the cylinder contacting faces of the piston rings are positioned radially beyond the head of the piston and the lands between the rings so as to form the entire cylinder contacting surface of the ring belt of the piston and to provide means through which heat may be dissipated from the upper part of the piston.

I prefer that, as shown in the figures, the grooves B be positioned and the flanges F be arranged so that the flanges F on adjacent rings extend across and substantially cover the lands E between adjacent grooves. However, I also prefer that the lands E be set back, as described above, a sufficient distance so that the flanges F while extending across the lands in the space between the faces of the lands and the cylinder wall do not contact with the faces of the lands.

It will be readily seen that when the rings are mounted on the piston as shown and described each ring will have a cylinder contacting face, the area of which approaches the combined areas of the contacting surfaces between the side faces of the ring and the side walls of the groove B in which the ring is mounted. In turn, the flow of heat through the piston and into the ring as shown by the arrows in Fig. 3 will be substantially the same as the flow from the ring into the cylinder wall and little or no resistance to the flow of heat through the piston will be created. With such a structure the heat will be dissipated from the cylinder head quickly enough to maintain a comparatively low temperature in the piston.

It may be readily understood that the size, shape and arrangement of the parts of the devices embodying my invention may be changed within wide limits without deviating from the spirit of my invention as included in the claims set forth below.

What I claim as new and desire to secure by Letters Patent, is:—

1. The combination with a piston having a plurality of annular grooves therein each adapted to receive a piston ring and having the lands adjacent said grooves formed integral with said piston, of a plurality of resilient split piston rings mounted in said grooves, said rings each being provided with a flange having a cylinder contacting face and extending from each side of said ring axially of said piston and said grooves being positioned and said flanges being arranged whereby the adjacent flanges of said rings in adjacent grooves substantially cover the lands therebetween and said cylinder contacting faces being positioned radially beyond the head of said piston and said lands so as to form the entire cylinder contacting surface of the ring belt of the piston.

2. The combination with a piston having a plurality of annular grooves therein each adapted to receive a piston ring and formed with the face of the lands adjacent said grooves set back from the face of the piston and said lands being integral with said piston, of a plurality of resilient split piston rings mounted in said grooves, said rings each being provided with a flange having a cylinder contacting face and extending from each side of said ring axially of said piston across said lands adjacent to said groove in which said ring is mounted and said cylinder contacting faces being positioned radially beyond the head of said piston and said lands so as to form the entire cylinder contacting surface of the ring belt of the piston.

3. The combination with a piston having a plurality of annular grooves therein each adapted to receive a piston ring and formed with the face of the lands adjacent said grooves set back from the face of the piston and said lands being integral with said piston, of a plurality of resilient piston rings mounted in said grooves and arranged to engage the side walls thereof, said rings each being provided with a flange having a cylinder contacting face and extending from each side of said ring axially of said piston across but not in contact with said lands adjacent to said groove in which said ring is mounted and said cylinder contacting faces being positioned radially beyond the head of said piston and said lands so as to form the entire cylinder contacting surface of the ring belt of the piston.

In witness whereof I have signed my name to the foregoing specification.

ARDEN JOHN MUMMERT.